United States Patent
Clayton et al.

(10) Patent No.: US 10,562,353 B2
(45) Date of Patent: Feb. 18, 2020

(54) TIRE CONSTRUCTION WITH FLATTENED SUMMIT AND CIRCUMFERENTIAL REINFORCEMENT

(75) Inventors: William Bennett Clayton, Simpsonville, SC (US); Daniel McEachern Hicks, Greenville, SC (US); Timothy B. Rhyne, Greenville, SC (US)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 1494 days.

(21) Appl. No.: 14/371,266

(22) PCT Filed: Jan. 16, 2012

(86) PCT No.: PCT/US2012/021425
§ 371 (c)(1),
(2), (4) Date: Jul. 9, 2014

(87) PCT Pub. No.: WO2013/109243
PCT Pub. Date: Jul. 25, 2013

(65) Prior Publication Data
US 2015/0013867 A1   Jan. 15, 2015

(51) Int. Cl.
*B60C 9/22* (2006.01)
*B60C 9/28* (2006.01)
(Continued)

(52) U.S. Cl.
CPC .............. *B60C 9/22* (2013.01); *B60C 9/0292* (2013.01); *B60C 9/2006* (2013.01);
(Continued)

(58) Field of Classification Search
CPC .................. B60C 9/22; B60C 9/28; B60C 9/0292; B60C 9/2006; B60C 2009/228;
(Continued)

(56) References Cited

U.S. PATENT DOCUMENTS 2,939,502 A * 6/1960 Hindin ...................... B60C 9/06
152/531
3,757,844 A * 9/1973 Verdier ...................... B60C 3/04
152/454
(Continued)

FOREIGN PATENT DOCUMENTS

EP  0 980 770 B1  12/2004
EP  2 199 103 A2   6/2010
(Continued)

OTHER PUBLICATIONS

Machine translation of JP03-057703 (no date).*
(Continued)

*Primary Examiner* — Justin R Fischer
*Assistant Examiner* — Philip N Schwartz
(74) *Attorney, Agent, or Firm* — Dority & Manning, P.A.

(57) ABSTRACT

A tire constructed with a plurality of reinforcement belts is provided. At least one of the reinforcement belts extends along the axial width of the tire summit and is constructed according to an equilibrium curve that is flat throughout the summit. The reinforcement belts include cable reinforcements that are substantially parallel to the equatorial plane. Substantial reductions in the tension experienced by the cables can be achieved to provide, as a result, improvements in e.g., tread wear.

12 Claims, 5 Drawing Sheets

(51) Int. Cl.
  *B60C 9/02* (2006.01)
  *B60C 9/20* (2006.01)
(52) U.S. Cl.
  CPC .............................. *B60C 2009/228* (2013.01);
    *B60C 2009/2214* (2013.01); *B60C 2009/2223*
    (2013.01); *B60C 2009/286* (2013.01)
(58) Field of Classification Search
  CPC ...... B60C 2009/286; B60C 2009/2214; B60C
      2009/2223; B60C 3/04; B60C 13/003
  USPC ........................................ 152/454, 527, 531
  See application file for complete search history.

(56) References Cited

U.S. PATENT DOCUMENTS

| | | | |
|---|---|---|---|
| 5,479,977 A * | 1/1996 | Tamano | B60C 9/09 |
| | | | 152/209.5 |
| 2003/0201050 A1 | 10/2003 | Gillard | |
| 2004/0089392 A1* | 5/2004 | Yukawa | B60C 9/2204 |
| | | | 152/533 |
| 2005/0126673 A1 | 6/2005 | Miyazaki | |
| 2005/0241742 A1 | 11/2005 | Tsuruta | |
| 2006/0169380 A1 | 8/2006 | Radulescu | |
| 2007/0256772 A1 | 11/2007 | Ferlin | |
| 2010/0139834 A1 | 1/2010 | Koga | |
| 2010/0065180 A1 | 3/2010 | Kaisha | |
| 2010/0180999 A1 | 7/2010 | Bruschelli | |
| 2011/0308686 A1 | 12/2011 | Chaulet | |
| 2013/0168000 A1 | 4/2013 | Kuwayama | |

FOREIGN PATENT DOCUMENTS

| | | | |
|---|---|---|---|
| EP | 2 199 105 A1 | 6/2010 | |
| JP | 03057703 A * | 3/1991 | ............... B60C 9/18 |
| WO | WO 1998/058810 A1 | 12/1998 | |
| WO | WO 2007/073753 A1 | 7/2007 | |
| WO | WO2011/161854 * | 12/2011 | ............... B60C 9/22 |

OTHER PUBLICATIONS

PCT International Search Report for PCT/US2012/021425, dated May 10, 2012.
European Search Report for for application 12865742.6 dated Jan. 14, 2016.

* cited by examiner

TIRE CONSTRUCTION WITH FLATTENED SUMMIT AND CIRCUMFERENTIAL REINFORCEMENT

FIELD OF THE INVENTION

The subject matter of the present invention relates generally to a tire having circumferentially-oriented reinforcements in the summit and that is constructed according to an equilibrium curve that is flat in the summit as further described.

BACKGROUND OF THE INVENTION

Equilibrium curves are used in tire design to define the geometry of the tire particularly, e.g., the shape of the carcass, which is a reinforcing structure that extends through the crown or summit of the tire and between the bead regions located on each side of the tire. Upon the inflation and loading of the tire, the equilibrium curve used in designing and constructing the tire will substantially determine the stresses that will be experienced by belts in the summit. The equilibrium curve also helps determine the exterior profile of the tire as well as its potential for wear during use.

Conventionally, the equilibrium curves used for tire design and construction have typically used a three-ply membrane model that provides significant curvature for the tire along the summit region. The carcass is usually constructed to follow the shape of the equilibrium curve. Belts in the summit that are placed over, or radially outside of, the carcass adopt much of their shape and, therefore, curvature from the shape of the carcass.

As used herein, "droop" refers to the difference in position, along the radial direction, between the center (i.e. at the equatorial plane) of a belt in the summit and the edge of such belt. As the tire rolls through the contact patch (the portion of the tire in contact with the road), the tire flattens in the contact patch when under a load. Droop in a summit belt contributes to the amount of tension experienced by the belt as it flattens in the contact patch. Such belt tension provides a limitation on the overall width to which a tire can be designed and constructed. This width limitation is undesirable because in certain applications a wider tire can provide performance advantages. For example, for certain commercial truck tire applications, a wide tire can replace a pair of narrower tires and provide improvements in fuel efficiency.

Additionally, droop in a summit belt leads to differences in rolling radii. More specifically, the radii from the axis of rotation for a drooping summit belt will likely be different at various locations along the axial direction. This difference can, in turn, result in different average longitudinal stresses along the contact patch between the center and shoulder regions of the tread so as to provide undesirable differences in wear rate across the tread width. Also, less evenly distributed contact pressure between the tire and road surface can occur across the contact patch so as to further aggravate differences in wear rate across the tread width.

Accordingly, a tire and/or equilibrium curve for a tire that can be used to avoid or minimize droop would be useful. More specifically, an equilibrium curve that allows designing and constructing wider tires with improvements in performance would be beneficial. Such an equilibrium curve that can allow e.g., the use of wider summit belts and tread widths with improvements in tread wear would also be particularly useful.

SUMMARY OF THE INVENTION

Aspects and advantages of the invention will be set forth in part in the following description, or may be obvious from the description, or may be learned through practice of the invention.

In one exemplary embodiment, the present invention provides a tire defining axial, circumferential, and radial directions. The tire also defines equatorial and meridian planes and has a summit region positioned between sidewall portions of the tire. The tire includes a carcass extending between the sidewall portions and through the summit region of the tire; a working ply positioned radially outside of the carcass and extending along the axial direction of the tire; and a plurality of reinforcement belts positioned radially outside of the carcass and positioned in the summit region of the tire. At least one of the reinforcement belts extends along the axial direction and through the equatorial plane, and at least one of said reinforcement belts extends between the sidewall portions of the tire. The reinforcement belts each include a plurality of circumferentially-oriented cables and each have a straight profile within a meridian plane of the tire. A tread portion is positioned radially outside of the reinforcement belts and extends through the summit region and between the sidewall portions of the tire.

In another exemplary embodiment, the present invention provides a tire defining axial, circumferential, and radial directions. The also defines a meridian plane and has a summit region positioned between side-wall portions of the tire. The tire includes a carcass extending between the sidewall portions and through the summit region of the tire, a working ply positioned radially outside of the carcass and extending along the axial direction of the tire, and at least one reinforcement belt positioned radially outside of the carcass and in the summit region of the tire. The at least one reinforcement belt has at least one axially outer end that extends to one sidewall portion of the tire and another axially outer end extending to the other sidewall portion of the tire. The reinforcement belt includes a plurality of circumferentially-oriented cables and has a flat profile within a meridian plane of the tire. A tread portion is positioned radially outside of the reinforcement belts and extends through the summit region and between the sidewall portions of the tire.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

The present invention provides a tire constructed with one or more reinforcement belts that extend along the axial direction in the tire summit and are constructed according to an equilibrium curve that is flat throughout the summit. The one or more reinforcement belts include cable reinforcements that are substantially parallel to the equatorial plane. Substantial reductions in the tension experienced by the cables can be achieved to provide, as a result, improvements in e.g., tread wear. For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

The following terms are defined as follows for this disclosure:

"Axis of rotation of the tire" is the axis around which the tire rotates during its normal use.

"Axial direction" refers to a direction parallel to the axis of rotation of the tire and is designated with the letter A.

"Radial direction" is orthogonal to the axial direction and extends in the same direction as any radius that extends orthogonally from the axial direction. The radial direction is designated with the letter R.

The "circumferential" direction corresponds to the periphery of the tire and is defined by the rolling direction of the tire.

"Circumferentially-oriented" as used with regard to certain belt reinforcements of the present invention means either parallel to the equatorial plane or making an angle of 5 degrees or less with the equatorial plane.

"Rolling tread width" is the width of the tread on the tire that makes contact with the ground as the tire rolls through the contact patch.

"Summit," "tire summit," or "summit region" refers to that portion of the tire between the sidewalls and radially outside of the carcass of the tire. The summit, therefore, includes e.g., the tread portion of the tire and belts located between the tread portion and the carcass. The summit is also sometimes referred to as the crown of the tire.

"Equatorial plane" is a plane that is perpendicular to the axis of rotation of the tire and bisects the summit of the tire into two halves. The equatorial plane is designated with EP.

"Meridian plane" is a plane containing the axis of rotation of the tire.

Figure 1:
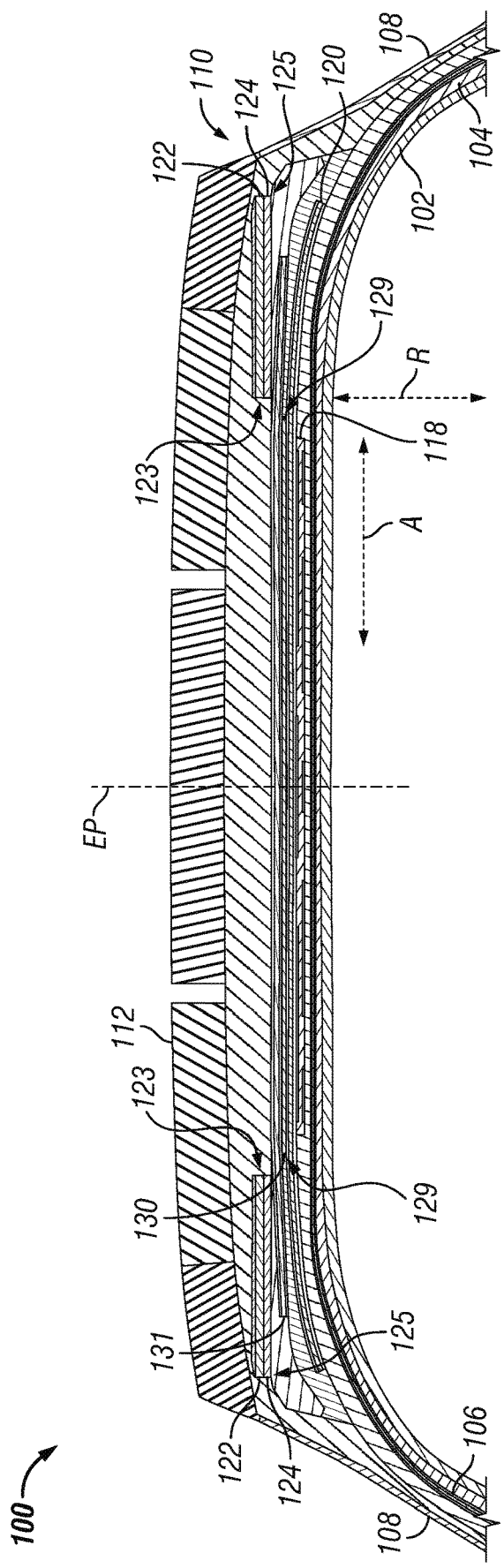
FIG. 1 provides a cross sectional view, taken along a meridian plane, of an exemplary embodiment of a tire according to the present invention.

FIG. 1 provides a cross-sectional view, taken along the meridian plane, of tire 100 in an exemplary embodiment of the present invention. Tire 100 includes a summit 110 that extends between the top of sidewall portions 108 and is bisected by the equatorial plane EP. As will be understood by one of skill in the art, radially inward of the sidewalls portions is bead section of the tire (not shown) that includes a bead core and is used to seat tire 100 onto a wheel or rim. Tire 100 also includes a tread portion 112. The present invention is not limited to only the tread configuration shown and, instead, can include multiple ribs, blocks, and/or combinations thereof, Asymmetrical designs about the equatorial plane are also contemplated.

A carcass 106 extends between the sidewall portions 108 and through tire summit 110. Carcass 106 is typically anchored in the bead sections and helps contain the outward forces provided by air pressure within tire 100. Carcass 106 may include multiple reinforcements such as e.g., cords oriented along the radial direction and/or at angles therefrom. Radially inward to carcass 106 is a pair of inner liner layers 102 and 104. Such layers are constructed from e.g., an air impermeable material to retain air within tire 100.

Tire 100 also includes a breaker belt 118 that is positioned radially outward of carcass 106. In general, breaker belt 118 helps to protect against punctures or other forces that might damage carcass 106 and/or inner layers 102 and 104. Working plies 120 and 131 are positioned radially outward of breaker belt 118 and radially inward of tread portion 112. By way of example, working plies 120 and 131 provide strength and stiffness to tire 100 including stiffness with regard to steering.

For the exemplary embodiment of FIG. 1, tire 100 includes a reinforcement belt 130 that is positioned between plies 120 and 131. Reinforcement belt 130 has an axial width that is slightly larger than breaker belt 118, in this particular embodiment, but does not extend to reinforcement belts 122 and 124, which are positioned radially outside of working ply 131. However, other configurations for the axial width arrangement of belt 130 relative to belts 122 and 124 may be used as well. Reinforcement belts 122 and 124 also do not intersect the equatorial plane EP of tire 100 and, instead, are positioned in essentially identical fashion on both sides of the equatorial plane and near the top of sidewall portions 108.

As shown, reinforcement belts 122 and 124 are spaced apart along the axial direction and, in fact, extend to an axial width that is greater than e.g., belt 118, and plies 120 and 131. White other widths may be used, in one preferred embodiment of the invention reinforcement belts 122 and 124 extend to an axial width that is between about 86 percent to about 110 percent of the rolling tread width of tire 100. In still another embodiment, reinforcement belts 122 and 124 extend along the axial width of the tire by a distance that is between about 0 to about 40 mm greater than the axial width of the working ply 131. Also, for the embodiment of FIG. 1, the axially-inner ends 123 of reinforcement belts 122 and 124 is axially outside of the ends 129 of reinforcement belt 130.

The carcass 106 of tire 100 is constructed according to an equilibrium curve that is flat along the summit 110 of the tire. In turn, as shown in FIG. 1, when tire 100 is inflated to its normal operating pressure, reinforcement belts 122, 124 and 130 have a straight profile within a meridian plane of the tire as shown in FIG. 1. As a result, tire 100 has little or no droop as previously discussed.

Figure 6:
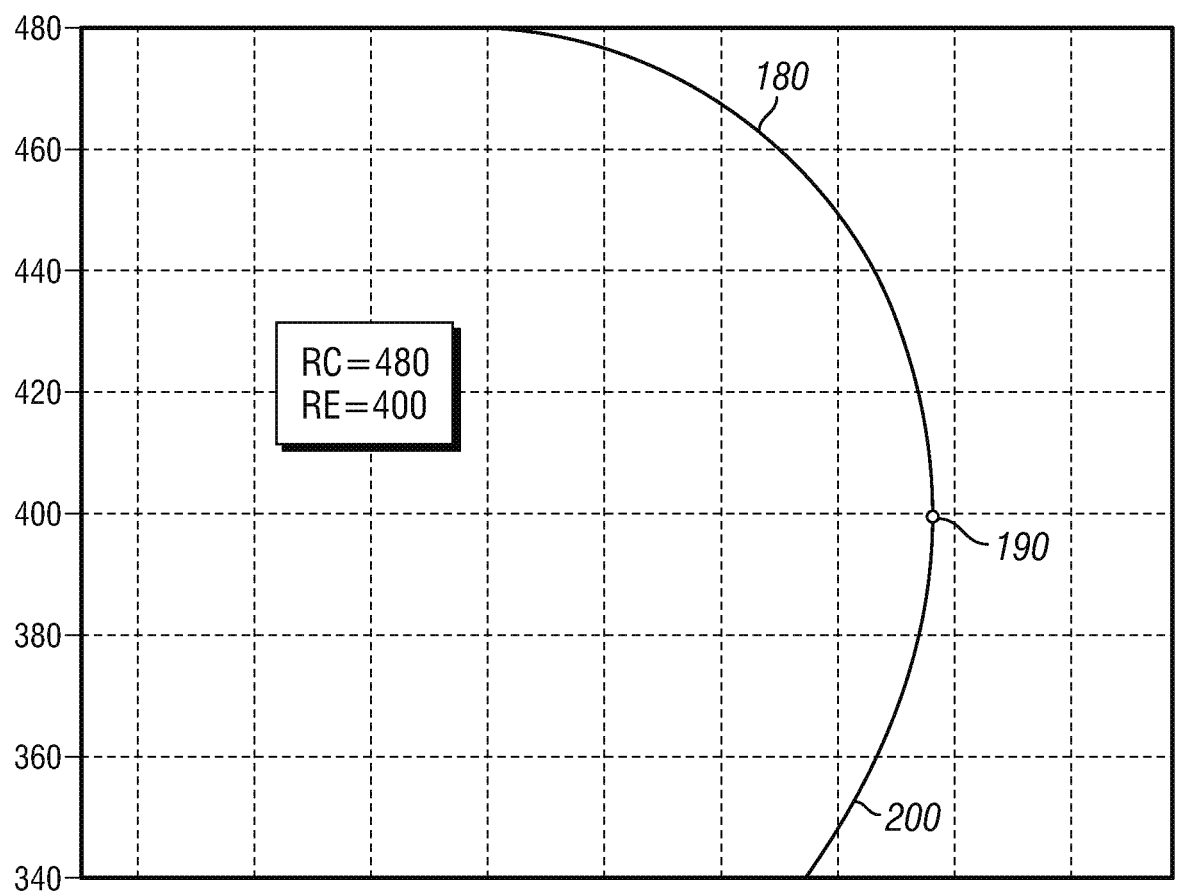
FIG. 6 is a plot of a portion of an equilibrium curve as used in exemplary embodiments of the present invention.

Along the sidewalk of tire 100, carcass 106 is constructed according to an equilibrium curve that is shown in FIG. 6. The equilibrium curve includes a first part 180 that begins at equator 190 and extends upwardly towards the summit of the tire where it becomes tangent to the axial direction (i.e. tangent to a line parallel to the x-axis). The second part 200 of the equilibrium curve also begins at equator 190 and extends downwardly towards the bead section of tire.

The equilibrium curve in the sidewalls of tire 100 as shown in FIG. 6 can be characterized by 2 parameters: Rc, the center radius, and Re, the equator radius. The equilibrium curve can be described by a differential equation and can also be unambiguously constructed starting from the center radius by calculating the tangent angle ⊥ and curvature P of the curve at each subsequent radius. The expressions for the tangent angle and curvature for a radial equilibrium curve are well known to one of skill in the art and are given as follows:

$$\sin\varphi = \frac{(r^2 - r_e^2)}{(r_c^2 - r_e^2)} \quad (1)$$

$$\kappa = \frac{2r}{(r_c^2 - r_e^2)} \quad (2)$$

where the center radius $r_c$ and the equator radius $r_e$ are parameters which depend upon, e.g., the dimension of the tire being designed. In the example given in FIG. 6, $r_c$=480 mm and $r_e$=400 mm.

Figure 2:
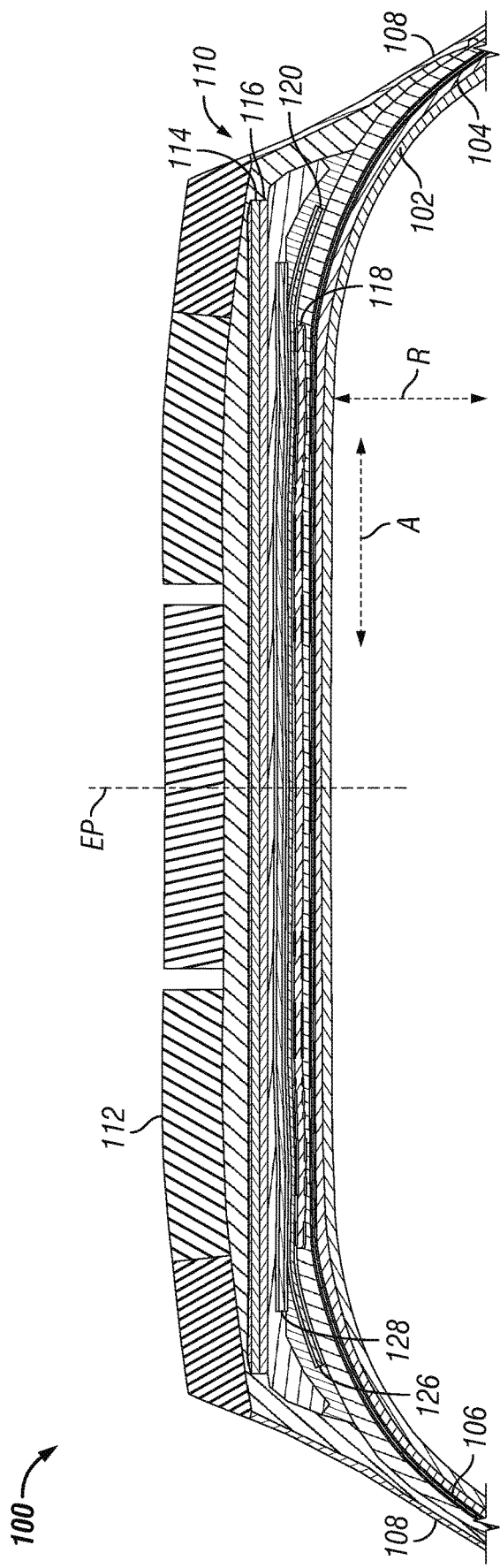
FIG. 2 provides cross sectional view, taken along a meridian plane, of another exemplary embodiment of a tire according to the present invention.

FIG. 2 provides another exemplary embodiment of tire 100 according to the present invention where the same reference numerals as used in FIG. 1 indicate the same or similar components as FIG. 1. In the exemplary embodiment of FIG. 2, tire 100 includes two reinforcement belts 114 and 116 that each extend between sidewall portions 108, through the summit 110, and intersect the equatorial plane ER Reinforcement belts 114 and 116 are each positioned radially outside of working ply 128 and radially inside of tread portion 112. Another working ply 126 is positioned radially outside of breaker belt 118 but radially inside of working ply 128.

As shown, reinforcement belts 114 and 116 extend along the axial direction and, in fact, extend to an axial width that is greater than e.g., belt 118, and plies 126 and 128. While other widths may be used, in one preferred embodiment of the invention the axially outermost ends 125 of reinforcement belts 114 and 116 extend to an axial width that that is between about 86 percent to about 110 percent of the rolling tread width of tire 100. In still another embodiment, the axially outermost ends 125 of reinforcement belts 114 and 116 extend along the axial width of the tire by a distance that is between about 0 to about 40 mm greater than the axial width of the working ply 128.

In a manner similar to the embodiment of FIG. 1, the carcass 106 of tire 100 is constructed according to an equilibrium curve that is flat along the summit 110 of the tire. In turn, as shown in FIG. 2, when tire 100 is inflated to its normal operating pressure, reinforcement belts 114 and 116 have a straight profile within a meridian plane of the tire as shown in FIG. 2. As a result, tire 100 has little or no droop as previously discussed. Along the sidewalls of tire 100 of FIG. 2, carcass 106 is constructed according to an equilibrium curve as described above with regard to FIG. 1 and as shown in FIG. 6.

As stated above, tire 100 of the exemplary embodiments of both FIGS. 1 and 2 is constructed according to an equilibrium curve as described. As will be understood by one of ordinary skill in the art using the teachings disclosed herein, "constructed according to an equilibrium curve" means the tire is constructed such that carcass 106 assumes substantially the shape of such curve when tire 100 is properly inflated and allows for adjustments to the actual shape of the curve as may be developed during design of the tire by e.g., finite element analysis and/or other computational methods.

For the exemplary embodiments of FIGS. 1 and 2, reinforcement belts 114, 116, 122, 124, and 130 are each constructed from a plurality of circumferentially-oriented cables that are either parallel to the equatorial plane EP or within the range of 0 to 5 degrees from the equatorial plane EP. Preferably, the cables are continuous about the circumference of the tire and are constructed from steel that can be referred to as semi-elastic in that the cables have elongations at break of greater than 2 percent. In addition, preferably the cables are bi-modular—i.e. on a curve representing the tensile stress as a function of relative elongation, the curve has shallow gradients for low elongation and a substantially constant, steep gradient for higher elongation. Also, the cables have a very low modulus before curing, for elongations of less than 2 percent, which makes it possible to increase the circumferential development of belts 114, 116, 122, 124, and 130 during curing of the tire. Alternatively, other constructions such as high elongation cable or steel monofilament, or other materials, such as textile or aramid, etc. may be used as well.

A variety of shapes along the circumferential direction may be used for the cables located in reinforcing reinforcement belts 114, 116, 122, 124, and 130. For example, the cables may have a wavy configuration as shown in FIG. 2 of EP 0980770, Zig-zag may also be used in certain applications. In fact, using the teachings disclosed herein, one of skill in the art will understand that other constructions for the cables in these reinforcement belts may also be used.

Figure 3A:
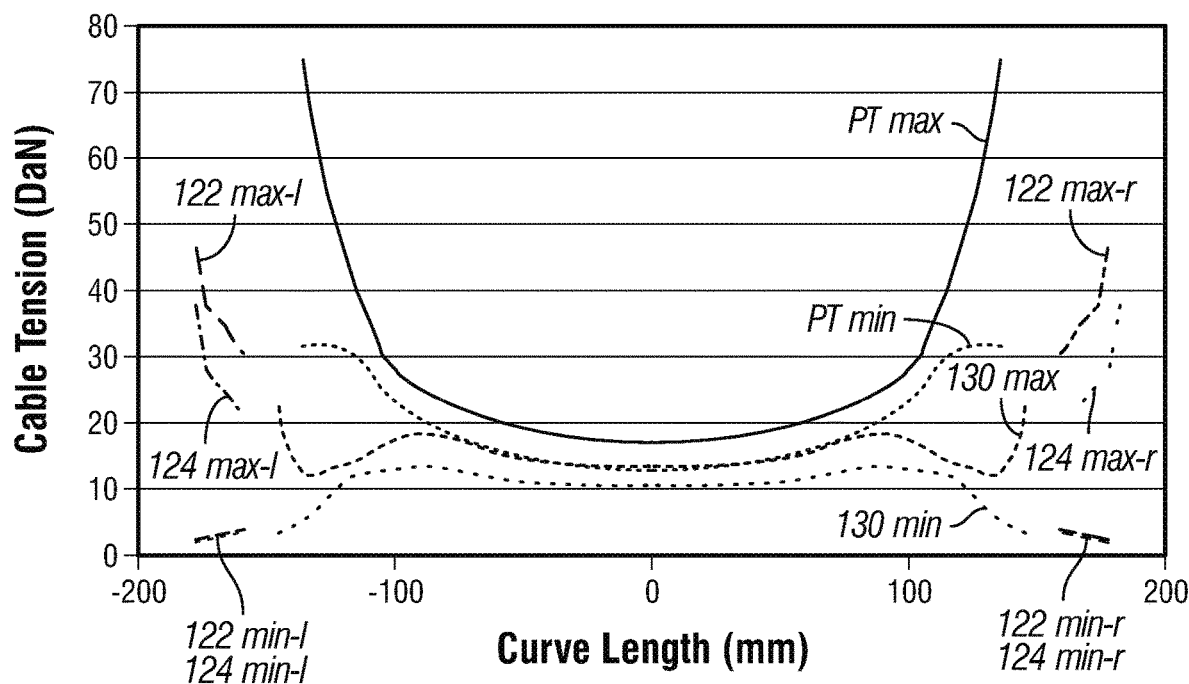
FIG. 3A is a plot of simulation data for both the exemplary embodiment of FIG. 1 as well as a known tire construction.

A tire constructed according to the exemplary embodiments described herein, particularly a wider tire, can have several performance advantages such as e.g., improvements in tread Wear that can be attributed at least in part to the absence of droop. FIG. 3A, for example, provides a plot of simulated, cable tension data for a production tire (PT) of size 445/50 R22.5 that does not include reinforcement belts that are flat or that have a straight profile along a meridian plane of the tire. Also included is simulated data for cable tensions in the reinforcement belts 122, 124, and 130 of the exemplary embodiment of FIG. 1. Both the maximum (max) and minimum (mm) cable tensions that result as the tire is rotated one complete revolution are depicted including data for the left (I) and right (r) sides for belts 122 and 124. The center of the plot, i.e. where the x-axis is zero, represents the center or equatorial plane EP of the tire.

As shown by the data simulation, the average cable tension is much lower for the exemplary embodiment of FIG. 1 than the production tire. The highest cable tension experienced in belts 122, 124, and 130 is also significantly lower than the highest cable tension for the production tire.

Figure 3B:
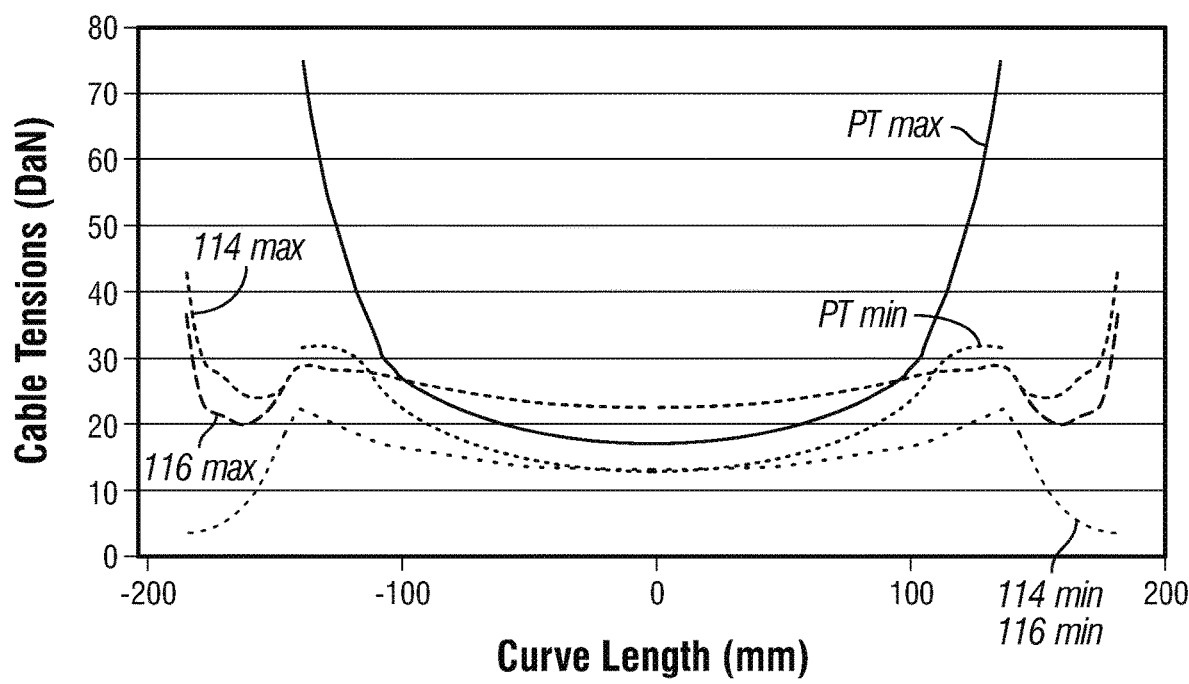
FIG. 3B is a plot of simulation data for both the exemplary embodiment of FIG. 2 as well as a known tire construction.

Similarly, FIG. 3B provides a plot of simulated, cable tension data for a production tire (PT) of size 445/50 R22.5 that does not include reinforcement belts that are flat or that have a straight profile along a meridian plane of the tire. Also included is simulated data for cable tension in the reinforcement belts 114 and 116 of the exemplary embodiment of FIG. 2. Again, as shown by the data simulation, the average cable tension is much lower for the exemplary embodiment of FIG. 2 than the production tire. The highest cable tension experienced in belts 114 and 116 is also significantly lower than the highest cable tension for the production tire.

Figure 4:
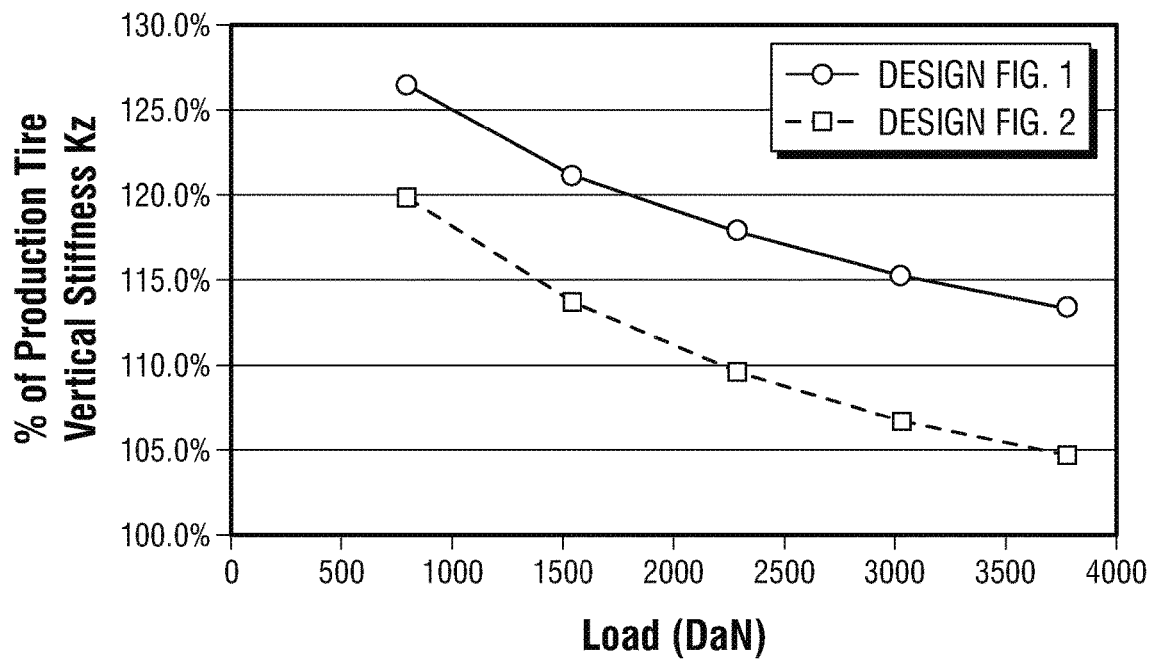
FIG. 4 is plot of simulated vertical stiffness data for of the exemplary embodiments of FIGS. 1 and 2 as a percentage of the vertical stiffness for a known tire construction.

FIG. 4 provides another plot of simulated data comparing the embodiments of FIGS. 1 and 2 with the production tire. Over a substantial range of loads, the embodiments of FIGS. 1 and 2 provide a vertical stiffness, $K_z$, that is substantially greater than the production tire. Again, this higher stiffness helps provide, e.g., improvements in tread wear.

Figure 5:
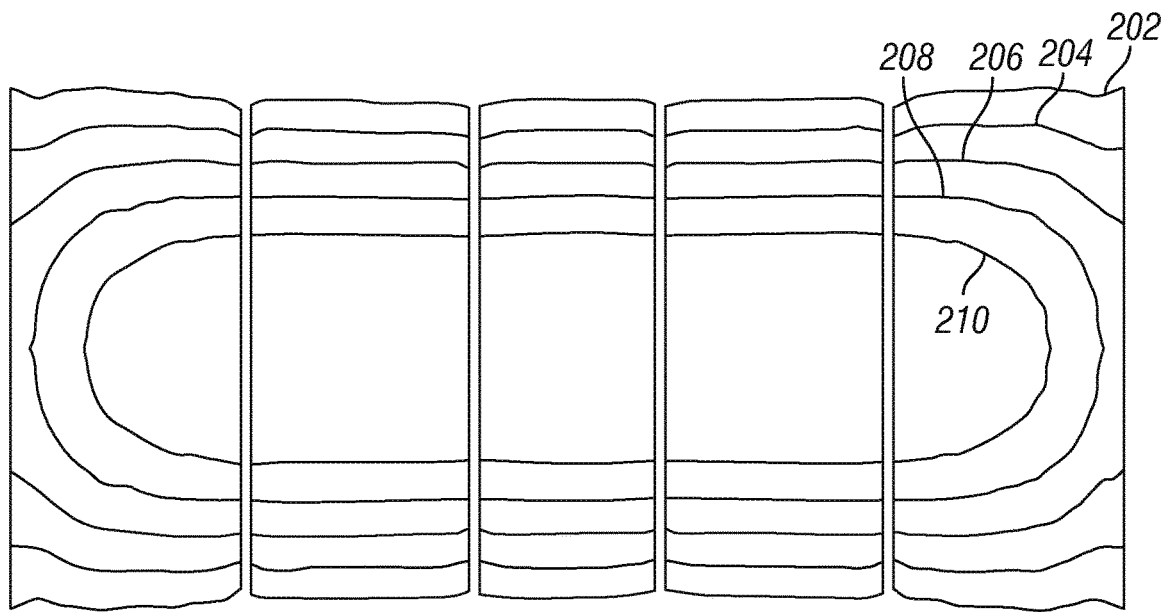
FIG. 5 is a simulated plot of the footprint for the exemplary embodiments of FIGS. 1 and 2 as well as known tire construction.

With the help again of simulated data, FIG. 5 provides several plots of the footprints 202, 204, 206, 208, and 210 that are obtained at various loads for a tire constructed according to the exemplary embodiment of FIG. 1 and corresponds to the loads shown in FIG. 4. As will be recognized by one of skill in the art, these footprints provide substantial improvement in that their shape overall approaches that of a rectangle, which is good for tread wear performance. The production tire PT does not provide shapes that are as rectangular. Additionally, the shoulder ribs of the tread portion of the tire maintain most of their surface in contact with the ground even at lighter load.

It should be understood that for the exemplary embodiments of FIGS. 1 and 2, additional reinforcing belts (with e.g., circumferentially-oriented cables as described) of various widths and configurations can be added to either embodiment to yield still further embodiments of the invention. Additionally, the present invention also includes embodiments having a single reinforcing belt have axially outer ends that extend to the shoulder portions of the tire. Such single reinforcing belt may intersect the equatorial plane of the tire or may be constructed of two portions positioned on opposing sides of the equatorial plane without intersection.

While the present subject matter has been described in detail with respect to specific exemplary embodiments and methods thereof it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A tire defining axial, circumferential, and radial directions, the tire also defining equatorial and meridian planes and having a summit region positioned between sidewall portions of the tire, the tire comprising:
   a carcass extending between the sidewall portions and through the summit region of the tire;
   a working ply positioned radially outside of said carcass and extending along the axial direction of the tire;
   a plurality of reinforcement belts positioned radially outside of said carcass and positioned in the summit region of the tire,
      at least one of said reinforcement belts extending along the axial direction and through the equatorial plane, and at least one of said reinforcement belts extending to one of the sidewall portions of the tire;
   said reinforcement belts each comprising a plurality of circumferentially-oriented cables;
   wherein said reinforcement belts each have a straight profile within a meridian plane of the tire;
   wherein at least two of said plurality of reinforcement belts are positioned on imposing sides of the equatorial plane without intersecting the equatorial plane of the tire; and
   a tread portion positioned radially outside of said reinforcement belts and extending through the summit region and between the sidewall portions of the tire.

2. The tire as in claim 1, wherein said working ply is positioned radially-inward of said at least two reinforcement belts.

3. The tire as in claim 1, wherein the tire is constructed according to an equilibrium curve that is flat along the summit region and, along the sidewall portions of the tire, the equilibrium curve that can be described by the following equations:

$$\sin\varphi = \frac{(r^2 - r_e^2)}{(r_c^2 - r_e^2)}$$

$$\kappa = \frac{2r}{(r_c^2 - r_e^2)}$$

where $r_c$ and $r_e$ are parameters describing the radius of the center and the equator of the sidewall portion of the equilibrium curve.

4. The tire as in claim 1, wherein said circumferentially-oriented cables comprise a plurality of steel cables that have elongations at break of greater than 2 percent.

5. The tire as in claim 1, wherein said circumferentially-oriented cables are at angle in the range of 0 to about ±/−5 degrees from the equatorial plane.

6. A tire defining axial, circumferential, and radial directions, the tire also defining equatorial and meridian planes and having a summit region positioned between sidewall portions of the tire, the tire comprising:
   a carcass extending between the sidewall portions and through the summit region of the tire;
   a working ply positioned radially outside of said carcass and extending along the axial direction of the tire;
   a plurality of reinforcement belts positioned radially outside of said carcass and positioned in the summit region of the tire,
      at least one of said reinforcement belts extending along the axial direction and through the equatorial plane, and at least one of said reinforcement belts extending to one of the sidewall portions of the tire;
   said reinforcement belts each comprising a plurality of circumferentially-oriented cables;
   wherein said reinforcement belts each have a straight profile within a meridian plane of the tire;
   wherein at least two of said plurality of reinforcement belts are positioned on opposing sides of the equatorial plane without intersecting the equatorial plane of the tire and are located adjacent to, and radially outward of, said at least one reinforcement belt extending along the axial direction through the equatorial plane; and
   a tread portion positioned radially outside of said reinforcement belts and extending through the summit region and between the sidewall portions of the tire.

7. The tire as in claim 6, wherein the axially outermost ends of the at least two of said plurality of reinforcement belts extend along the axial direction past the rolling tread width of the tire and have an axial width that is in the range of about 86 percent to 110 percent of the rolling tread width.

8. The tire as in claim 6, wherein the amount by which the axially outermost ends of said at least two reinforcement belts extends along the axial direction is in the range of about 0 mm to about 40 mm greater than the axial width of said working ply.

9. The tire as in claim 6, wherein said working ply is positioned radially-inward of said plurality of reinforcement belts.

10. The tire as in claim 6, wherein the tire is constructed according to an equilibrium curve that is flat along the summit region and, along the sidewall portions of the tire, the equilibrium curve that can be described by the following equations:

$$\sin\varphi = \frac{(r^2 - r_e^2)}{(r_c^2 - r_e^2)}$$

$$\kappa = \frac{2r}{(r_c^2 - r_e^2)}$$

where $r_c$ and $r_e$ are parameters describing the radius of the center and the equator of the sidewall portion of the equilibrium curve.

11. The tire as in claim 6, wherein said circumferentially-oriented cables comprise a plurality of steel cables that have elongations at break of greater than 2 percent.

12. The tire as in claim 6, wherein said circumferentially-oriented cables are at angle in the range of 0 to about +/−5 degrees from the equatorial plane.

\* \* \* \* \*